Dec. 17, 1963

A. K. MILLS 3,114,269

GYROSCOPE CAGING MECHANISM

Filed March 22, 1961

INVENTOR
ALLAN MILLS
BY
*C. A. Weigel, Jr.*
ATTORNEY

Dec. 17, 1963

A. K. MILLS 3,114,269

GYROSCOPE CAGING MECHANISM

Filed March 22, 1961

INVENTOR
ALLAN MILLS
BY
ATTORNEY

Dec. 17, 1963    A. K. MILLS    3,114,269
GYROSCOPE CAGING MECHANISM
Filed March 22, 1961    3 Sheets-Sheet 3

INVENTOR
ALLAN MILLS
BY
ATTORNEY

United States Patent Office 3,114,269
Patented Dec. 17, 1963

3,114,269
GYROSCOPE CAGING MECHANISM
Allan K. Mills, Canoga Park, Calif., assignor to
Tamar Electronics Industries Inc.
Filed Mar. 22, 1961, Ser. No. 97,515
14 Claims. (Cl. 74—5.1)

This invention relates to a gyroscope caging mechanism and, more particularly, to a relatively simple, low power device capable of accurately "erecting" the spin axis of a gyroscope to a predetermined reference relationship with respect to the gyroscope frame.

As is well known in the art, a gyroscope may be considered as a device which responds to a torque applied perpendicular to the spin axis, by moving (precessing) around an axis perpendicular to the spin axis and to the axis of the torque. In many such gyroscopes it is necessary, or desirable, to provide some means of erecting, or caging, the spin axis of the gyroscope to a predetermined reference position with respect to the gyroscope frame. The term "caging," when used in gyroscope terminology, refers to that process by which the spin axis of the gyroscope is forced into a predetermined alignment with the gyroscope frame by mechanical or electromagnetic means.

Gyroscopes often are classified by specifying the degrees of freedom of angular motion available to its spinning wheel. Thus, if the spinning wheel is suspended by a single pivot frame, hereinafter referred to as "gimbal," to rotate in a single plane about a single pivot axis, it is said to have one degree of freedom. If the gyroscope is provided with two gimbals with pivot axes mutually perpendicular, it is said to have two degrees of freedom. With this understood, it may be stated that a gyroscope may be caged by causing its gimbals, and hence its spin axis, to assume a predetermined reference position with respect to the gyroscope frame. An excellent discussion of the types of gyroscopes and their theory of operation appears in Control Engineers' Handbook by John G. Truxall, published by McGraw Hill in 1958.

Using conventional techniques, gyroscopes may be caged by a spring operated cam and follower mechanism and uncaged; i.e., the gimbals released, by a separate stepping motor. Many existing gyroscope caging mechanisms are actuated by a D.C. solenoid of a type requiring relatively large amounts of electrical power to accomplish the caging operation. Such caging systems often require hundreds of parts to accomplish the caging operation which increases the probability of malfunction and makes operation under varying environmental conditions more difficult, if not more unreliable.

Alternative prior art caging mechanisms cage by precessing the gyroscope gimbals to their caged position. Unfortunately this method requires considerable power for the reason that the precession rate is quite low unless relatively large forces are applied. Still other prior art caging mechanisms have used a locking mechanism to aid in caging such that, on the application of caging power, the gyroscope gimbals are locked together, thus negating the usual precessional forces which must be overcome. With the use of such locking mechanism, the caging mechanism need only overcome the inertia of the gimbal system and caging time is reduced.

Unfortunately, however, such locking mechanisms have usually employed a separate solenoid in addition to that which effects the caging. These solenoid drives have the disadvantage of requiring excessive power which usually is at a premium. These complex prior art caging techniques, with their attendant large power requirements, have tended to make gyroscopes somewhat unreliable, difficult to manufacture, and costly.

In addition, many prior art caging mechanisms, when employed on gyroscopes having inner and outer gimbals, tend to produce gimbal errors in the uncaging operation. This error arises from the fact that the inner gimbal is usually unlocked, or uncaged, at a point in time immediately prior to unlocking, or uncaging, the outer gimbal. These errors are particularly bad if the uncaging takes place during an oscillating condition of the gyroscope. This difficulty has been overcome in the prior art by a technique known as single point uncaging; i.e., simultaneously releasing both gimbals. Here again, though, the prior art solutions have been both costly and too complex.

It is therefore an object of this invention to obviate many of the disadvantages of the prior art gyroscope caging mechanisms.

Another object of this invention is to improve gyroscope caging mechanisms.

Still another object of this invention is to provide a simple mechanical drive apparatus requiring a relatively low amount of power for driving a member in a first direction and little or no power for movement in a second direction.

An additional object of this invention is to provide a simple unidirectional locking apparatus.

In accordance with a preferred embodiment of this invention, caging of a gyroscope having two degrees of freedom is achieved by replacing the usual caging solenoid with a low power, low torque, caging motor and spring clutch. Specifically, the gyroscope caging arm is driven by the caging motor acting through a worm gear reduction and a spring clutch. A spring loaded lever holds the spring clutch normally engaged so that when the caging motor is energized, the caging arm is actuated. As the caging arm moves toward its caged position, it engages a ring shaped cam on the outer gimbal and causes the outer gimbal to rotate until the caging arm falls through a slot in the cam locking it in the reference position.

Further, in accordance with the invention, the inner gimbal is restrained from precessing during caging of the outer gimbal by a friction detent which is depressed by a cam on the caging arm shaft on its downward stroke. When the caging arm has traveled far enough to contact the inner gimbal caging cam, the detent is released, allowing the inner gimbal to rotate to its reference position. Both gimbals thus quickly are caged by the action of a single caging arm with a relatively low expenditure of energy.

In accordance with still another feature of this invention, uncaging springs in the caging mechanism are compressed during the caging cycle such that, during the uncaging cycle, they rotate the caging arm back to its uncaged position. This has the advantage of requiring the expenditure of energy only during the caging cycle to effect not only caging but also uncaging of the gyroscope gimbals. During the uncaging cycle, the detent button is again depressed to hold the inner gimbal in position while the caging arm is withdrawn from the outer gimbal. This feature has the advantage of single-point caging without the attendant normally complex structures required. While the gyroscope is uncaged, the caging arm is locked in its uncaged, or up, position by a simple spring clutch lock.

Further advantages and features of this invention will become apparent upon consideration of the following description read in conjunction with the drawings wherein.

Figure 1:
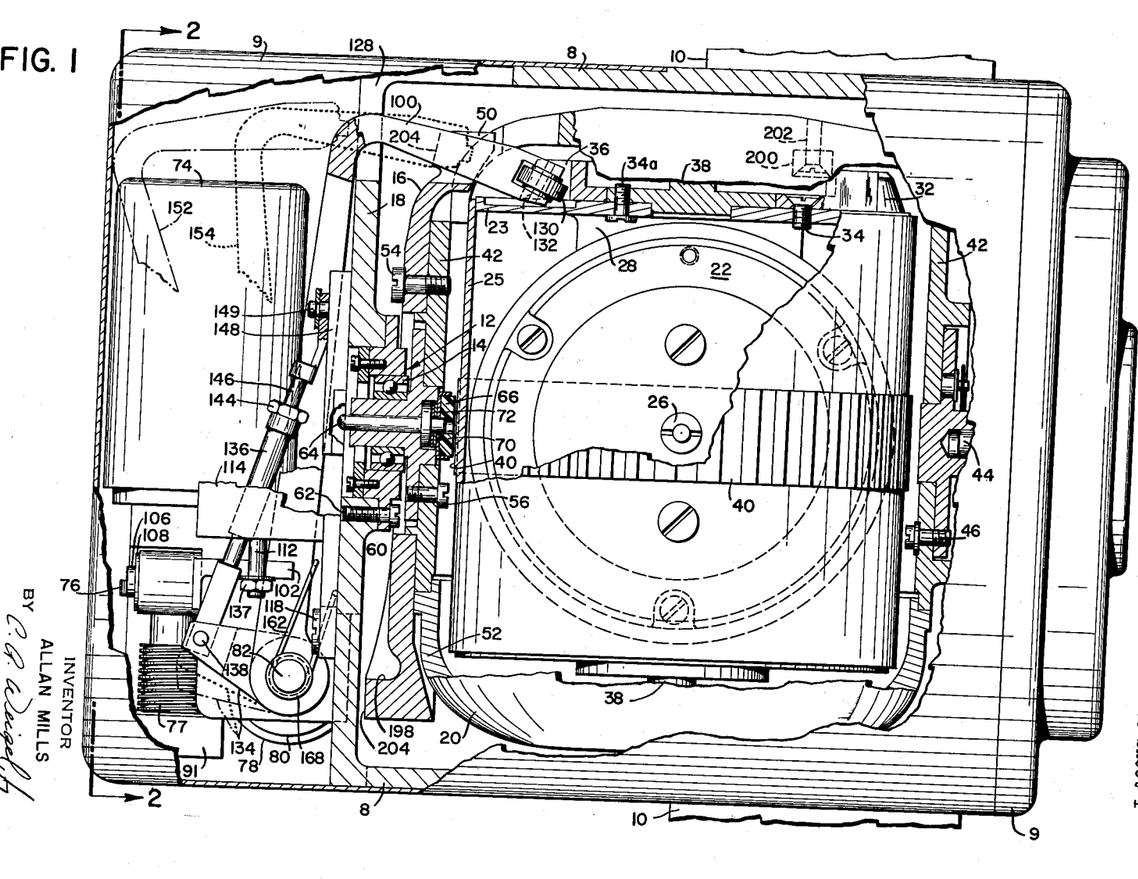
FIGURE 1 is a partially cut-away side view of a gyroscope and the caging mechanism therefor constructed in accordance with this invention.
Figures 2, 3A, 3B, 3C:
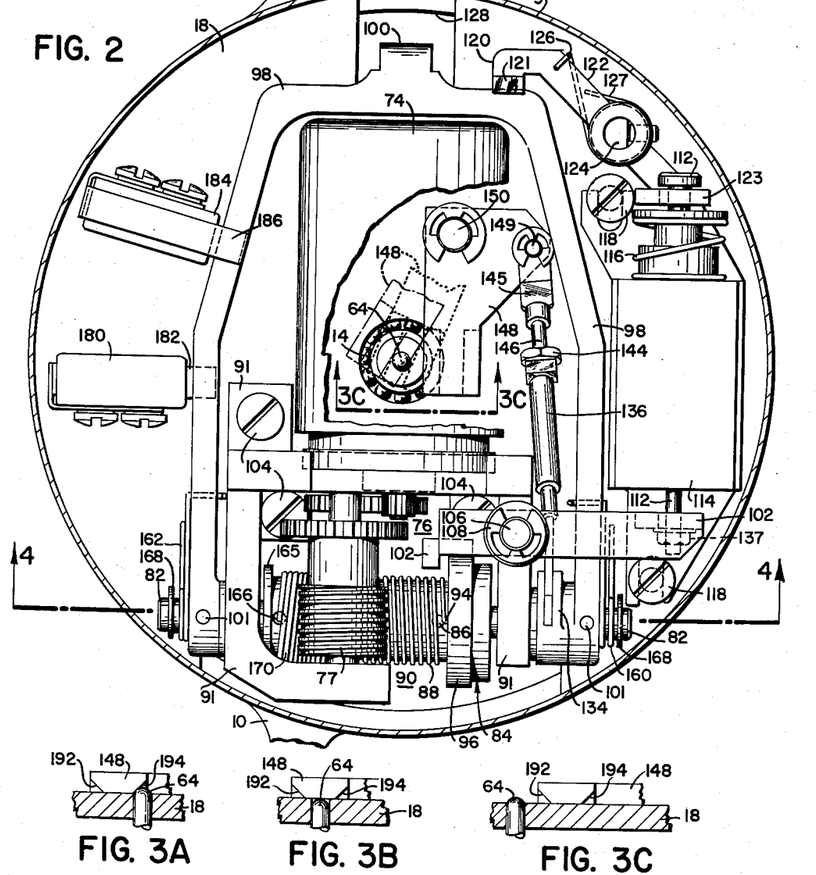
FIGURE 2 is an end view of the gyroscope illustrated in FIG. 1 taken through the section 2—2.
FIGURES 3a, 3b and 3c are cross-section views of the caging mechanism detent and cam (in different positions) therefor taken along the section 3—3 of FIG. 2.
Figure 4:
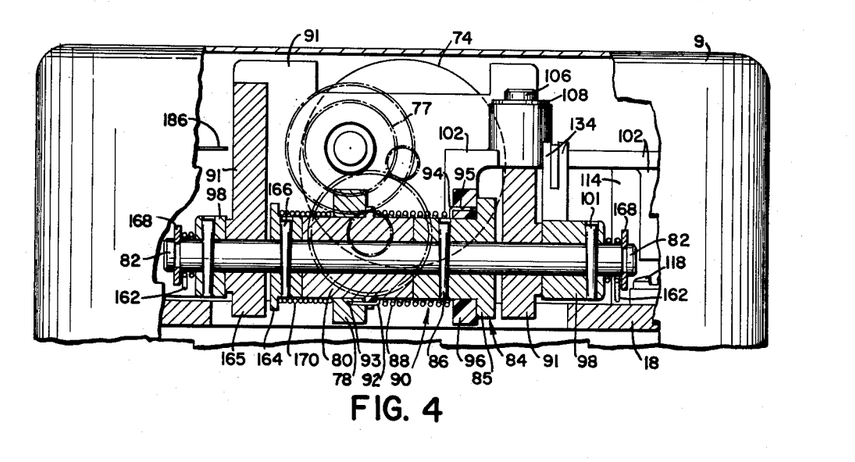
FIGURE 4 is a partially cut-away front view of the caging mechanism of the gyroscope of FIG. 1 constructed in accordance with this invention.

In FIGURE 1 there is illustrated a gyroscope having a cast frame 8, that is cylindrical in shape and has a caging assembly, constructed in accordance with this invention, mounted on one end thereof. The caging assembly itself, as illustrated in the views of FIGS. 2 through 4, inclusive, is mounted on an end disc 18 which is placed at one end (the left end in the drawing) of the frame 8. A mounting flange 10, only a portion of which is shown for the sake of clarity, is integral with the frame 8 and located near the center of gravity of the gyroscope. End caps 9 are soldered to each end of the frame 8 to hermetically seal the unit. For the most part, the gyroscope illustrated is conventional, the changes in accordance with this invention being made primarily in the caging assembly, the gimbal caging cams, and detent mechanism as will be described in detail below.

Typically, the gyroscope of FIG. 1 may have ball bearings 14 for the gimbal suspension, an induction motor drive and a potentiometer pick-off to sense the position of the gimbals. Slip rings and wipers (not shown) may be used to bring the output through the gimbal pivots and to provide power to the gyroscope spin motor. Many of these elements, which are conventional gyroscope elements, are neither shown nor described for the sake of clarity and brevity.

Thus, the gyroscope illustrated in FIG. 1 includes a spin motor 22 (illustrated partly in dotted and partly in solid lines). The spin motor which typically may be a hysteresis synchronous motor 22 is mounted on a single piece cast frame 28 inside the inner gimbal assembly 24 of the gyroscope to spin on an axis that is perpendicular to the plane of the drawing of FIG. 1, as denoted by the motor shaft 26. The inner gimbal assembly 24 is illustrated as cylindrical in shape utilizing the single piece frame 28 which supports the spin motor 22. Only a portion of the frame 28 is shown in the drawing, but it may be two doughnut shaped, flat end discs 23 joined together by a center portion. The single piece frame 28 is encased by a sleeve 25 which also is illustrated as being partially cut-away to permit a view of the placement of the spin motor 22 and the frame 28. The inner gimbal assembly 24 is mounted at either end by suitable ball bearing mounted pivots 38. A commutation shaft (not shown) at the lower pivot 38 may afford a means of providing electrical power to the spin motor 22 in a conventional manner.

The inner gimbal assembly 24 has a heart-shaped cam 32 (see also FIG. 5) coupled to its upper end disc 23 by means of three screws 34 (only one is illustrated in FIG. 1). As will be described in more detail hereinafter, in conjunction with FIG. 5, the caging cam 32 has a reference slot 36 appearing in the upper left portion (FIG. 1) of the drawing which is adapted to receive the caging arm 100 from the caging assembly. The cam 32 has a cam surface 208, adapted to engage the caging arm 100, that extends for slightly more than 90° about the pivot 38 on either side of the slot 36. The cam surface 208 has its low point on either side of the slot 36 such that the caging arm 100 action causes rotation of the inner gimbal assembly until the reference slot 36 and the caging arm 100 are in alignment.

A knurled ring 40 is placed about the periphery of the sleeve 25 of the inner gimbal assembly 24 to allow it to be locked to the outer gimbal assembly 20 during the caging operation. Further, the end discs 23 of the frame 28 each include a pivot 38 (the upper pivot 38 is shown in cross-section) mounted to the end discs 23 by suitable means such as screws 34a (only one of which is illustrated). The inner gimbal assembly 24 is mounted by the pivots 38 (which may include ball bearings) inside the outer gimbal assembly 20 to provide one degree of freedom for the spin motor 22.

The outer gimbal assembly 20 may be cast and is generally cylindrical in shape (see also FIG. 5) and is illustrated partially cut-away in order to afford a view of the inner gimbal assembly 24 and motor 22. The outer gimbal assembly 20, which is seen mostly in cross-section area 42 in FIG. 1, has one end 52 (the lower end in the drawing) in the form of a cap which is removable for installation of the inner gimbal assembly 24. The outer gimbal assembly 20 is mounted by a pair of pivots 12 at either end such that its axis of rotation is perpendicular to the axis of rotation on the pivots 38 of the inner gimbal assembly 24. The pivots 12, as illustrated in the left portion of the drawing, are ball bearings mounted by the ball bearings 14. The bore for the bearings 14 typically is provided by a steel sleeve 60 which is held in place against the gyroscope frame end disc 18 by the screw 62. Typically, a commutator shaft 44 (see right side of FIG. 1) for the outer gimbal assembly 20 provides electrical connections for the inner gimbal 24 and the motor 22, as well as the sensor potentiometers (not shown) that indicate the position of the inner gimbal 24. Thus far, the description is that of a conventional gyroscope.

In accordance with the invention, a detent pin 64 is inserted and passed through the center of the left hand pivot 12 from the outer gimbal assembly 20 end disc 18. The end of the detent pin 64 adjacent the knurled ring 40 has a nylon tooth 66 and is held in position by and mounted to a leaf spring 72 and includes a stop 70 to limit its upward action (to the left in the drawing of FIG. 1). The tooth 66 thus normally is disengaged from the knurled ring 40 of the inner gimbal assembly 24. The outer gimbal also has a caging cam 16 attached to its (left hand) end 42 by screws 54 such that its cam surface 204 engages the caging arm 100. This structure and operation will be described in more detail hereinafter in conjunction with FIG. 5. Suffice it to say for the present that the cam 16 has a reference slot 50 at its low point that may accommodate the caging arm 100.

In the left hand portion of the drawing of FIG. 1 there is illustrated a caging motor 74 which is mounted on a U-shaped mounting assembly 91. The mounting assembly 91 in turn is mounted on the gyroscope frame end disc 18 by the screws 104. The motor 74 is mounted to act through a gear train 76, held by the mounting assembly 91, to drive a worm 77. The worm 77 is positioned to engage a worm gear 78 which is mounted on a worm gear hub 80. The worm gear hub 80 in turn is concentrically mounted so as to be freely rotatable on a caging arm pivot shaft 82. It is perhaps more easy to understand the structure of the caging assemby by simultaneously referring to the drawings of FIGS. 1, 2 and 4 as the description of the caging assembly progresses. A drum 84 which is the same diameter as the worm gear hub 80 is mounted concentrically on the shaft 82 to the right of (FIG. 4) the worm gear hub 80 and is locked to the shaft 82 by means of a pin 86.

A clutch spring 88 is wrapped loosely around both the worm gear hub 80 and the drum 84 in the direction illustrated in FIG. 2. The clutch spring 88, the drum 84, and the worm gear hub 80 comprise a spring clutch assembly 90 through which the torque of the caging motor 74 is transmitted to the pivot shaft 82. The spring 88 has a first end 92 (FIG. 4) which is inserted into a retainer hole 93 in the worm gear hub 80. The spring 88 also has a second end 94 which is inserted into a retainer hole 95 in a nylon ring 96 which is loosely mounted on the drum 84 and is held in position by a flange 85 on the end of the drum 84. A Y-shaped caging member 98 is mounted on either end of the shaft 82 and is locked thereto by the pin 101. The leg of the Y-shaped member is bent downwardly (FIG. 2) so as to provide a caging arm 100 which is adapted to extend through a hole 128 in the end disc 18 of the gyroscope frame 8. The caging arm 100 has a small wheel 130, mounted on the end thereof by means of a pin 132, that is positioned to engage both the inner gimbal caging cam 32 and the outer gimbal caging cam 16 as it moves downwardly through the caging slot 128.

A clutch engaging lever arm, 102, which may be stamped and bent from a piece of sheet stock to have a tab at either end, is mounted on a pivot 106 and held in position to the pivot by a lock ring 108. The left hand end of the lever arm 102 (FIG. 2) is adapted to engage or impinge against the nylon wheel 96 so as to prevent motion thereof and, as will be described hereinafter, thereby engage the spring clutch assembly 90. The other end of the lever arm 102 (right hand end in the drawing of FIG. 2) is connected to be driven by the actuating member 112 of a solenoid 114. The actuating member 112 is spring loaded by a spring 116 such as to normally impinge the left hand end of the lever arm 102 (FIG. 2) against the nylon wheel 96. The solenoid 114 may be suitably mounted to the gyroscope frame end disc 18 such as by screws 118.

The Y-shaped caging member 98 is held in its down (caged) position by a catching latch 120 which is formed on one end of a latch lever arm 122 which is mounted on a pivot stud 124. The lever arm 122 may be suitably punched and formed from a piece of sheet stock to have the catching latch 120 on the one end and have a tab 123 on the other end for mechanically coupling it to the actuating member 112. A spring 126 is placed around the pivot stud 124 and has one end 127 locked in a retaining hole (not shown) in the end disc 18. The other end of the spring 126 is bent around the lever arm 122 such as to normally force the latch 120 to engage the caging member 98 when it is in the down position. The latch 120 has a bevelled portion 121 which the latch 120 strikes in its downward motion such as to depress the spring loaded latch 120 until it snaps over the caging member 98 thus locking it in the down, or caged, position. Activation of the solenoid 114 counteracts the spring 116 and causes each of the lever arms 102 and 122 to rotate clockwise (FIG. 2) to release, respectively, the caging member 98 and the spring clutch 90.

Next to be described is the actuating means for the detent pin 64 which is depressed during both the caging and the uncaging cycles of the gyroscope in order to lock the inner gimbal assembly 24 to the outer gimbal assembly 20. An integral part of the right hand part of the Y of the caging member 98 where it pivots on the pivot shaft 82 is a detent cam lever 134 (FIG. 2). The cam lever 134 is connected by means of a pin 138 to a turnbuckle 136. The turnbuckle 136 has a threaded rod 146 which is adjustable and is locked by a lock nut 144. The threaded rod 146 in turn has a lug pressed over its end. The lug 145 slips over a pivot stud and lock washer assembly 149. The pivot stud 149 is mounted on a detent cam 148 which pivots on another pivot stud 150 which in turn is mounted on the end disc 18 of the gyroscope frame.

The detent cam 148 as may be observed from the drawings of FIGS. 3a, 3b, and 3c, taken from the view 3—3, show the end disc 18 in cross-section, the rounded end of the detent pin 64 and the detent cam 148. It is noted that the detent cam includes a leading bevelled edge 194 and a trailing bevelled edge 192. Thus, as the caging member 98 is rotated downwardly in the drawing by the pivot shaft 82 into its caging position, the turnbuckle 136 rotates the detent cam 148 to the right in the drawing of FIG. 2 from its left most position (which is illustrated in FIG. 3a and by the dash-dot lines of FIG. 2), to the center position (illustrated in FIG. 3b and by the dotted lines of FIG. 2) which depresses the detent pin 64 while the outer gimbal assembly 20 is being caged, and then allows the detent cam 148 to pass on to the extreme right position (denoted by the solid line in FIG. 2 and in FIG. 3c) which allows the spring loaded detent pin 64 to again rise and disengage the inner gimbal assembly 24. It may be noted at this point that the caging member 98 and arm 100 (FIG. 1) are illustrated in their several positions by the solid, dotted, and dash-dot lines corresponding to the conditions just described. The caging arm 100 and the detent cam 148 are both driven in synchronism by rotation of the pivot shaft 82. As will be described hereinafter this permits, by a simple adjustment of the length of the turnbuckle 136, precise single point uncaging of the inner and outer gimbals.

A pair of uncaging springs 162 are placed on either end of the pivot shaft 82, immediately adjacent the caging member 98. One end of each uncaging spring 162 is bent so as to be caught by the caging member 98; the other end of the spring is allowed to rest against the end disc 18 of the gyroscope frame. In this manner, the downward motion of the caging member 98 compresses the spring such that the stored energy in the compressed spring uncages the gyroscope once the caging member 98 is released. Retaining rings 168 are placed on either end of the pivot shaft 82 to hold the uncaging springs 162 in position.

A locking drum 164 also is mounted on the pivot shaft 82 immediately adjacent (to the left of in the drawings of FIGS. 2 and 4) the worm gear hub 80. The locking drum is concentric with and essentially of the same diameter as the worm gear hub 80. The locking drum 164 has a flange 165 on its left hand portion (FIG. 4) and is fixed to the pivot shaft 82 by the pin 166. A caging arm lock spring 170 is tightly wrapped about the worm gear hub 80 and about the locking drum 164 on the pivot shaft 82. The lock spring 170 is wound in such direction (FIG. 2) that downward motion of the caging member 98 turns the pivot shaft 82, and hence the locking drum 164, in a direction that tightens the lock spring 170 around the worm gear hub 80 and the locking drum 164. Since the worm gear 78 cannot be driven backwards against the worm 77, it can be considered fixed to the frame end disc 18 when the caging motor 74 is off. Hence, any downward rotation of the caging member 98, as may be caused by acceleration or shock, merely winds the lock spring 170 tighter against the worm gear hub 80 and the locking drum 164 thus effectively locking the pivot shaft to the frame and preventing any downward motion of the caging arm 100.

On the other hand, when the worm gear 77 is driven, the spring lock unit including the locking drum 164, the worm gear hub 80, and the lock spring 170 moves as a whole with the caging arm; i.e., the direction of rotation is such that tends to loosen the lock spring 170, and hence is allowed to slide freely over the locking drum 164, or move freely with the downward motion of the caging member 98.

A caged limit switch 180 (FIG. 2) has an actuating arm 182 and is suitably mounted on the end disc 18 in such a position that its actuating arm 182 opens the caged limit switch when the caging member 98 impinges thereagainst at the end of the caging downward motion. The actuating arm 182 then opens the limit switch 180 which, as will be apparent in FIG. 6, turns off the caging motor 74. Also, an uncaged limit switch 184 is mounted adjacent the caged limit switch 180 on the end disc 18 of the gyroscope frame. The uncaged limit switch 184 has an actuating arm 186 which is positioned to be engaged when the caging member 98 is at the end of its upswing or uncaging cycle. The uncaged limit switch 184, as will be described in connection with the circuit diagram of FIG. 6, de-energizes the solenoid 114 and hence engages the clutch 90 such that the gyroscope is again ready for another caging cycle.

Figure 5:
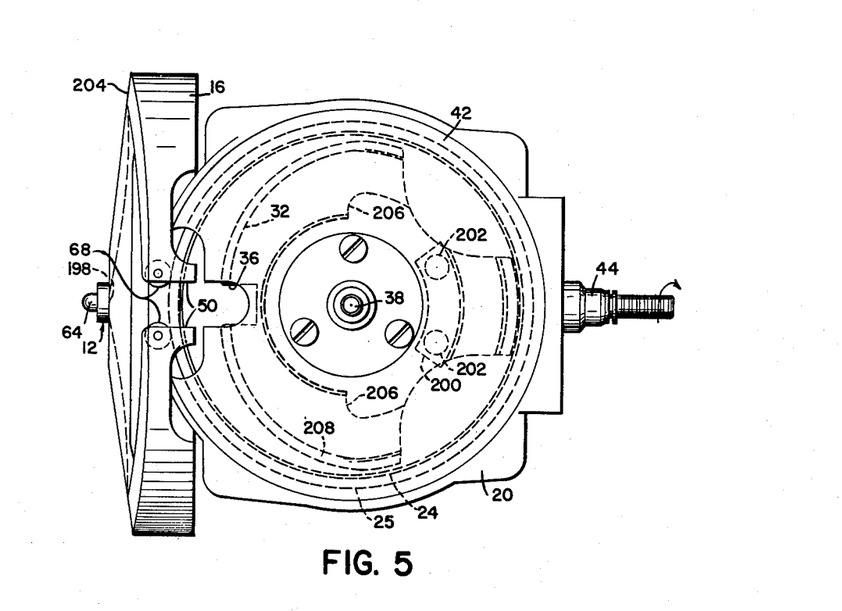
FIGURE 5 is a plan view of the inner and outer gimbal assemblies and caging cams therefor of the gyroscope illustrated in FIG. 1.

In FIG. 5 there is shown only the inner and outer gimbal assemblies 24 and 20, respectively. The view is that of a plan view, considering that the view of FIG. 1 is a side, or elevation view. Thus, the pivot 38 of FIG. 1 appears as circles 38 in the drawing of FIG. 5. There is also illustrated in FIG. 5 the detent 64 as it passes through the hollowed outer gimbal pivot assembly 12. The outer gimbal cam 16 is seen to be generally ring shaped and has a cam surface 204. The outer gimbal cam 16 is mounted by suitable means such as screws 54 (only one is illustrated for the sake of clarity) to the outer gimbal shell 42. The cam surface 204 is ground such that it can engage the roller 130 of the caging arm 100.

The "high point" of the cam surface 204 appears at the point 198 (see also FIG. 1) which is diametrically opposite the "low point" which is the slot 50 through which the caging arm 100 passes when the gimbal is caged. Hence, if the caging arm applies pressure to any point of the cam surface 204, the entire outer gimbal cam 16 and outer gimbal 20 rotate until the caging arm 100 is allowed to slip through the slot 50 and the outer gimbal is caged in its reference position with respect to the frame 8.

Mounted on the pivots 38 in the outer gimbal 20, so as to be capable of rotating in a plane perpendicular to the axis of rotation of the outer gimbal 20, is the inner gimbal assembly 24 (which is illustrated by dotted lines since it is mounted within the outer gimbal 20). The inner gimbal 24 has an inner gimbal cam 32 which extends only over slightly more than 90° on either side of the inner gimbal references 36. Rotation of the inner gimbal 24 in excess of 180° is prevented by a bumper 200 which is fixed to the outer gimbal 20 by the screws 202 (see also FIG. 1). The inner portion of the inner gimbal cam 32 is heart-shaped during its casting so as to provide additional bumper surfaces 206 which prevent the inner gimbal cam 32 from rotating in either direction beyond the bumper 200. It is thus apparent that the inner gimbal actually has a freedom of movement of less than 180° because of the bumper action. The purpose of these bumpers 200 and 206 is to restrict the rotation of the inner gimbal to prevent gimbal lock (alignment of the gyroscope spin axis with the outer gimbal axis). The cam surface 208 of the inner gimbal cam is tapered to cause rotation of the inner gimbal cam 24 to its low point which occurs at the caging slot 36 when the caging arm 100 impinges against the cam surface 208.

Figure 6:
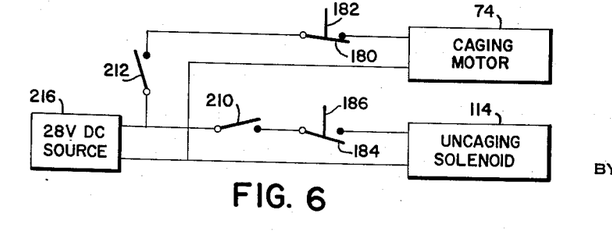
FIGURE 6 is a schematic wiring diagram of the switching circuitry necessary to control the caging mechanism of this invention.

In FIG. 6 there is shown a schematic diagram of a suitable wiring arrangement that may be used to actuate and deactuate the caging motor 74 and the solenoid 114 under control of the caging and uncaging switches 180 and 184, respectively. A D.C. source of potential 216 is connected through the series connected normally open start caging switch 212 and normally closed caged limit switch 180 to the caging motor 74.

As described, the caging limit switch 180 is actuated by the arm 182 such that when the caging member 98 reaches its down, or caged, position the switch 180 is opened. The caging operation is initially started by the closing of the switch 212 which actuates the caging motor to drive the caging member in the downward direction. Once, however, the caging member 98 completes its cycle and opens the caging limit switch 180, the caging motor is turned off. The caging member 98 remains locked in its downward position by the spring loaded latch 120.

In similar manner, the D.C. source 216 is serially connected through the uncaged limit switch 184, which is normally open, and through a second uncaging switch 210 to the solenoid 114. The uncaged limit switch 184 is normally open when the caging member 98 is in its uncaged, or up, position since the actuating arm 186 is pushed upwardly (see FIG. 2) by the caging member 98. When, however, the caging arm is in the caged position the uncaged limit switch 184 is closed. Under these conditions, the uncaging cycle may be started by closing the switch 210 and energizing the uncaging solenoid 114 which withdraws the spring loaded latch 120 and disengages the clutch engaging lever 102 allowing the caging member 98 to rotate to its uncaged, or up, position. In this latter position it opens the limit switch 184 which removes the power to the uncaging solenoid 114 such that clutch again becomes engaged.

In describing the operation of the caging mechanism of this invention, simultaneous reference may be had to each of the drawings of FIGS. 1 through 6, inclusive. Initially, assume that the caging member 98 and its associated caging arm 100 are in the up, or uncaged, position 152 (FIG. 1). In this initial condition, the D.C. source 216 (FIG. 6) has both its uncaged limit switch 184 and its uncage switch 210 open; hence, the uncaging solenoid 114 remains unactuated. In similar manner, although the caged limit switch 180 (FIG. 6) is closed, the D.C. potential from the source 216 is not applied to the caging motor 74 until the caging switch 212 is closed.

If it is now assumed that the caging switch 212 is closed, the caging motor 74 acting through the gear train 76, drives the worm 77 which rotates, or torques, the worm gear 78 in a direction to tighten the clutch spring 88 and to loosen the locking spring 170. The worm 77 is assumed to rotate in a counterclockwise direction as it is viewed in FIG. 4. The worm gear hub 80, it will be recalled, is mounted concentrically on the pivot shaft 82 but not fastened directly to it so that it is free to rotate about the shaft 82, whereas the drum assembly 84 is fixed to the shaft 82 by the pin 86. With the solenoid 114 deactivated, the clutch lever arm 102, spring loaded by the spring 116, presses against the nylon wheel 96 so that the nylon wheel 96 is not free to turn. It will be recalled that both ends 92 and 94 of the spring 88 are held by retaining holes 93 and 95, respectively. Hence, as the power from the caging motor 74 is transmitted through the gear train 76 to the worm gear hub 80, the spring 88 of the spring clutch assembly 90 causes the spring 88 to tighten around the worm gear hub 80 and the drum assembly 84. Once the wind up of the spring 88 is started, it becomes self-energizing and tightly grips both the worm gear hub 80 and the drum assembly 84, thereby transmitting the driving torque from the caging motor 74 to the pivot shaft 82. The torque transmitted to the pivot shaft 82 is in the clockwise direction, as viewed in FIG. 1.

The clockwise rotation of the pivot shaft 82 transmits driving torque to the caging member 98 and its caging arm 100 such that the caging arm 100 starts its caging through the slot 128 of the end disc 18 of the gyroscope frame 8 and also compressing the uncaging spring 162. Simultaneously therewith, the cam lever arm 134 drives the turnbuckle 136 (FIG. 1) to the right. This motion causes the detent cam 148 to rotate in a counterclockwise direction about its pivot stud 150 from its initial position as illustrated in FIG. 3a wherein the leading cam surface 194 has not engaged the detent pin 64 to that illustrated in FIG. 3b wherein the cam leading edge 194 passes over the detent button 64 depressing it and forcing the nylon tooth 66 against the knurled ring 40 around the inner gimbal assembly 24.

This action locks the inner gimbal assembly 24 to the outer gimbal assembly 20. By this means the caging mechanism of this invention now need only overcome the inertia of the gimbal system and caging can be accomplished in a relatively short time as opposed to the extended period required where the gimbals were allowed to precess. This technique also has the advantage in that although prior art caging mechanisms have locked the inner and outer gimbals together, they have for the most part required additional complex parts. In accordance with this invention the detent pin 64 is operable off of the same power source as is the caging arm 100.

Now, as the caging arm 100 is forced against the outer gimbal caging cam 16 (FIG. 5), the downward force of the caging arm 100 against the cam 16 causes the entire outer gimbal assembly 20 to rotate until the arm 100 falls through the slot 50 in the cam 16 thus locking the outer gimbal 20 in its reference position. As described previously, the inner gimbal assembly 24 is restrained from precessing during the caging of the outer gimbal 20 by the detent pin 64 which is depressed as the caging arm 100 moves in its downward stroke. The friction between the caging arm 100 and the cam surface 204 is reduced by the wheel 130 mounted at the end of the caging arm 100.

As the motion of the caging arm 100 continues through the slot 128 and has traveled far enough to contact the inner gimbal caging cam 32, the detent cam 148 has passed over the detent pin 64 to that position illustrated in FIGURE 3c. Hence, the detent button, which is spring loaded by the spring 72, is released allowing the inner gimbal assembly 24 to rotate freely. The continued downward motion of the caging arm 100 causes the wheel 130 to engage the surface 208 of the inner gimbal cam 32 and rotate it until the arm 100 falls into the reference slot 36. The inner gimbal assembly 24 is now locked in its reference position with respect to the gyroscope frame 8.

As the caging arm 100 makes its final drop into the inner gimbal reference slot 36, the arm 182 of the caged limit switch is actuated thereby opening the caged limit switch 180 to remove the power from the motor 74 and hence the caging member 98. Also, as the caging member 98 approaches its full down position it strikes against the cam surface 121 of the spring loaded latch 120 thereby depressing the latch 120 which is allowed to snap over the caging member 98 and lock it in the caged position.

The uncaging cycle is started by the closing of the uncaging switch 210 (FIG. 6). It will be recalled that with the caging member 98 in the caged position the uncaged limit switch 184 is allowed to close, so the solenoid 114 energizing circuit is complete. Thus actuated, the uncaging solenoid 114, acting through its actuating member 112, compresses the spring 116 and the spring loaded latch spring 126 to withdraw the latch 120 from the caging member 98 thereby releasing the caging arm 100. Simultaneously, the caging solenoid moves the clutch lever arm 102 away from the nylon ring 96 allowing the spring 88 to expand to its normal position. This action releases the clutch 90. Thus, with the clutch 90 disengaged and the spring loaded latch 120 released, the caging arm 100 freely returns to its uncaged position. The uncaging springs 162, which were compressed on the caging cycle of the caging member 98 during the caging cycle, rotate the caging arm in a counterclockwise direction (FIG. 1) to its up or uncaged position where it opens the uncaged limit switch 184 and removes the power from the uncaging solenoid 114.

During the uncaging motion of the caging arm 100, at the point where the inner gimbal assembly 24 becomes uncaged by the caging arm 100 leaving its reference slot 36, but the outer gimbal 20 has not yet been released, the trailing edge 192 (FIG. 3c) of the detent cam 148 again depresses the detent pin 64 as the detent cam 148 passes up over the detent pin 64. The depressed detent pin 64 holds the inner gimbal assembly 24 in position and locked to the outer gimbal assembly 20 while the caging arm 100 completes its uncaging of the outer gimbal 20. This gives the effect of single point uncaging without the additional complicated mechanisms required in the prior art systems. Gimbal errors caused by uncaging during oscillating conditions are reduced to a minimum. Further, the small rollers 68 (FIG. 5) in the reference slot 50 of the outer gimbal caging cam 16 allow the caging arm 100 to be withdrawn from the outer gimbal slot 50 with little friction.

Further, in accordance with the invention, to insure that the caging arm 100 remains in its uncaged position when subjected to acceleration or shock, an additional locking drum 164 which is fixedly mounted on the pivot shaft 82 and a lock spring 170 are employed. The locking spring 170 is wound tightly around the worm gear hub 80 and also the locking drum 164. As may be observed in the drawing of FIG. 2, the locking spring 170 is wound in such direction that the uncaging motion of the caging member 98 tends to unwind, or loosen, the locking spring 170. The locking drum 164 is therefore free to slip within the locking spring 170. On the other hand, since the worm gear 78 cannot be driven backwards against the worm 77, it can be considered fixed to the end disc 18 when the caging motor 74 is off. Now any downward rotation of the caging member 98 that may be caused by acceleration or shock causes the locking spring 170 to wind tighter about the locking drum 164 and the worm gear hub 80 thereby locking them securely together. Since the worm gear hub 80 cannot move, the pivot shaft 82 and hence the caging member 98 are prevented from moving to cage the gyroscope.

When, however, the worm gear 78 is driven, the worm gear hub 80 is allowed to slip freely within the locking spring 170 since the direction of its rotation is such as to tend to unwind or loosen the locking spring. Also, the worm gear hub 80 and the locking drum 164 and spring 170 are free to rotate as a unit with the caging member 98 and hence offer no resistance to the downward movement of the arm during the caging cycle. This unidirectional action allows the caging member 98 to slip in one direction and yet lock in the other.

There has thus been described a relatively simple gyroscope caging mechanism having a relatively small volume and weight and requiring relatively low power for actuation. The mechanism is capable, upon actuation of another low power electrical signal, to unlock or uncage the gimbal system from the frame in a relatively small amount of time with little or no errors or misalignment of the gimbal positions during the uncaging operation. Further, by the use of a detent pin operated directly by the caging drive system, precession between the gimbals during caging is prevented and hence the caging power and the time required to effect caging is greatly reduced. A novel and simple locking mechanism is employed to prevent the caging arm when in its uncaged position from being driven to effect undesired caging due to shock or acceleration forces.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. For example, the caging mechanism of this invention may be used to advantage with gyroscopes having only one degree of freedom.

I claim:
1. A mechanical driving arrangement for driving a mechanical member in a first direction and then in a second direction comprising, in combination, means including a return spring so associated with said mechanical member such that movement of said mechanical member in said first direction compresses said return spring, a prime mover, spring clutch means mechanically coupled to said prime mover to move said mechanical member in said first direction and thereby compress said return spring, means to engage said clutch means thereby to move said member in said first direction to a predetermined position, means to lock said member in said position, and means to disengage said clutch and unlock said lock means whereby said compressed return spring rapidly moves said mechanical member in said second direction.

2. A mechanical driving arrangement for driving a member in a first direction and then in a second direction comprising, in combination, means including a return spring so associated with said member that movement of said member in said first direction compresses said return spring, a low power prime mover, spring clutch means mechanically coupled to said prime mover to move said mechanical member in said first direction and thereby compress said return spring, means to engage said clutch means thereby to move said member in said first direction to a predetermined position, means to lock said member in said position, and means to disengage said spring clutch means and unlock said lock means whereby said compressed return spring rapidly drives said mechanical member in said second direction, said spring clutch disengaging means requiring a relatively low force whereby said mechanical member is driven in said second direction with relatively little expenditure of power.

3. A mechanical driving arrangement for rotating a member in a first direction and then in a second direction substantially opposite said first direction comprising, in combination, a return spring, means including said return spring to compress said return spring upon rotation of said first member in said first direction, a spring clutch mechanism coupled to said motor and having disengaging means operable to disengage said clutch mechanism with the expenditure of a relatively small amount of power, means including said clutch for transmitting torque from said motor to said member thereby to rotate said member in said first direction to a predetermined position, said rotation in said first direction compressing said return spring, means to lock said member in said position and low power means coupled to said disengaging means to disengage said clutch and unlock said lock means whereby said compressed return spring rotates said mechanical member in said second direction.

4. A gyroscope caging mechanism comprising a caging arm mounted on a pivot shaft and adapted to cage said gyroscope, a caging motor, a gear positioned to be driven by said motor, said gear having a center hub rotatively mounted on said caging arm pivot shaft, a drum having substantially the same diameter as said hub also mounted on said pivot shaft concentrically with said hub, a coil spring wrapped around said hub and said drum and having one end fastened to said hub, a collar rotatably mounted on said drum, the other end of said spring being fastened to said collar, a lever arm adapted to impinge against said collar so that rotation of said gear causes the spring to wind up around the drum and the gear hub thereby transmitting torque from said gear through said drum to said pivot shaft and hence said caging arm, whereby a low power caging motor may be used to cage said gyroscope.

5. In a gyroscope caging mechanism having a caging motor, a caging arm mounted on a pivot shaft and adapted to cage said gyroscope when actuated by said caging motor, the combination of a worm gear mounted on a hub and positioned to be driven by said motor, said hub being rotatably mounted on said caging arm pivot shaft, a drum having substantially the same diameter as said hub fixedly mounted on said pivot shaft concentrically with said hub, a coil spring wrapped around the hub of said worm gear and said drum and having one end fastened to said worm gear, a collar rotatably mounted on said drum, the other end of said spring being fastened to said collar, a lever arm adapted to normally impinge against said collar to prevent its movement whereby rotation of said worm gear causes said spring to tighten around said drum and said gear hub thereby transmitting torque from said caging motor through said drum to said caging arm thereby to cage said gyroscope, said caging arm having a return spring fastened thereto such that as said caging arm moves to cage said gyroscope said return spring is compressed, and means adapted to disengage said lever arm from said collar, thereby allowing the clutch spring to return to its original diameter and release the clutch thereby to uncage said gyroscope with the expenditure of a relatively small amount of energy.

6. A mechanical driving arrangement for rotating a member in a first direction and then in a second direction substantially opposite said first direction comprising, in combination, a return spring, means including said return spring to compress said return spring upon rotation of said first member in said first direction, a motor, a spring clutch mechanism coupled to said motor and having an engaging ring means which is operable to engage said clutch mechanism when locked, the locking of said engaging ring means requiring only the expenditure of a relatively small amount of energy, means including said clutch coupled to said motor for transmitting torque from said motor to said member, and means coupled to said engaging ring means for locking said engaging ring means to engage said clutch, thereby to rotate said member in said first direction, said rotation in said first direction compressing said return spring, and means coupled to said engaging ring means for unlocking said engaging ring means thereby to disengage said clutch whereby said compressed return spring rotates said member in said second direction, said clutch unlocking means adapted to be actuated by the expenditure of a relatively small amount of energy whereby the energy required to rotate said mechanical member in said second direction is reduced.

7. Apparatus for rotating a pivot shaft in a first direction from a first position to a second position comprising a hub rotatably mounted on said pivot shaft, a first and a second drum, each being of substantially the same diameter and fixedly mounted on said pivot shaft on either side of said hub, a worm gear mounted on said hub, a first spring loosely wrapped around said first drum and that portion of said hub adjacent said first drum in a first direction, a ring member rotatably mounted on said first drum, said first spring having one end fastened to said hub and the other end fastened to said ring member, means associated with said hub for rotating it only in said first direction, means to prevent rotation of said ring member, whereby said first spring is tightened about said hub and said first drum by rotation of said hub and torque is transmitted thereby to said pivot shaft, and a second spring tightly wrapped around said second drum and that portion of said hub adjacent thereto in said first direction whereby said pivot shaft can only rotate in said first direction only if said hub so rotates.

8. The apparatus set forth in claim 7 wherein said means to prevent rotation of said ring member includes a spring loaded lever which normally impinges against the ring member to prevent its rotation, a third spring fastened to said pivot shaft such that said spring is compressed with the rotation of said shaft in said first direction, and solenoid means coupled to said lever to remove it from impingement against said ring member whereby said pivot shaft is rotated in said second direction by said compressed spring.

9. A gyroscope having an inner gimbal assembly, said inner gimbal assembly including a rotor, and a gimbal shell, said rotor being supported by said inner gimbal shell, an outer gimbal assembly, said inner gimbal assembly being mounted inside said outer gimbal assembly by a first and second pivot such as to allow movement of said inner gimbal about a first axis, a frame member, said outer gimbal being mounted on said frame member by a third and a fourth pivot such as to allow rotation of said outer gimbal about a second axis perpendicular to said first axis, said gyroscope frame having a caging assembly mounted thereon, said caging assembly including a caging motor, a pivot shaft, a caging arm mounted on said shaft, a spring clutch mounted on said shaft and adapted when engaged to rotate said shaft, each said gimbals having a caging cam mounted concentrically with their respective axes of rotation, each of said cams having a reference position coinciding with the low point of each said cam and a slot at said reference position adapted to receive said caging arm, said outer gimbal caging cam slot adapted to permit said caging arm to pass therethrough to engage said inner gimbal caging cam, and means associated with said clutch to engage said clutch thereby to drive said caging arm against outer gimbal cam to rotate it to said reference position at which point said caging arm passes through said outer gimbal caging cam reference slot to engage said inner gimbal caging cam, and rotates said inner gimbal about its axis to its reference position, whereby said gyroscope is caged.

10. A gyroscope having an inner gimbal assembly, said inner gimbal assembly including a rotor, and a gimbal shell, said rotor being supported by said inner gimbal shell, an outer gimbal assembly, said inner gimbal assembly being mounted inside said outer gimbal assembly by a first and second pivot such as to allow movement of said inner gimbal about a first axis, a frame member, said outer gimbal being mounted on said frame member by a third and a fourth pivot such as to follow rotation of said outer gimbal about a second axis perpendicular to said first axis, said inner gimbal shell being substantially cylindrical in shape, said gyroscope frame having a caging assembly mounted thereon, said caging assembly including a caging motor, a pivot shaft, a caging arm mounted on said shaft, a spring clutch mounted on said shaft and adapted when engaged to rotate said shaft, each of said gimbals having a caging cam mounted concentrically with their respective axes of rotation, each of said cams having a reference position coinciding with the low point of each said cam and a slot at said reference position adapted to receive said caging arm, said outer gimbal caging cam slot adapted to permit said caging arm to pass therethrough to engage said inner gimbal caging cam, and means associated with said clutch to engage said clutch thereby to drive said caging arm against the outer gimbal cam to rotate it to said reference position at which point said caging arm passes through said outer gimbal caging cam reference slot to engage said inner gimbal caging arm, and rotates said inner gimbal about its axis to its reference position, whereby said gyroscope is caged, said caging assembly also including a detent pin mounted concentrically within said first pivot, and adapted to engage the cylindrical portion of said inner gimbal shell when depressed, and means including a detent cam mounted on said caging assembly to depress said detent pin when actuated, and lever arm means forming an integral part of said caging arm to rotate said detent cam across said detent pin thereby to actuate said detent pin to lock said inner gimbal to said outer gimbal to facilitate caging said gyroscope.

11. The gyroscope set forth in claim 10 wherein said detent cam has a relatively short dimension in the direction of its rotation whereby said detent cam passes over said detent pin as said outer gimbal becomes caged thereby releasing said detent to allow said inner gimbal to be caged with the continued motion of said caging arm.

12. A gyroscope having an inner gimbal assembly, said inner gimbal assembly including a rotor, and a gimbal shell, said rotor being supported by said inner gimbal shell, an outer gimbal assembly, said inner gimbal assembly being mounted inside said outer gimbal assembly by a first and second pivot such as to allow movement of said inner gimbal about a first axis, a frame member, said outer gimbal being mounted on said frame member by a third and a fourth pivot such as to allow rotation of said outer gimbal about a second axis perpendicular to said first axis, said inner gimbal shell being substantially cylindrical in shape and having a knurled ring formed on the periphery thereof, said gyroscope frame having a caging assembly mounted thereon, said caging assembly including a caging motor, a pivot shaft, a caging arm mounted on said shaft, a spring clutch mounted on said shaft and adapted when engaged to rotate said shaft, each of said gimbals having a caging cam mounted concentrically with their respective axes of rotation, each of said cams having a reference position coinciding with the low point of each said cam and a slot at said reference position adapted to receive said caging arm, said outer gimbal caging cam slot adapted to permit said caging arm to pass therethrough to engage said inner gimbal caging cam, and means associated with said clutch to engage said clutch thereby to drive said caging arm against outer gimbal cam to rotate it to said reference position at which point said caging arm passes through said outer gimbal caging cam reference slot to engage said inner gimbal caging cam, and rotates said inner gimbal about its axis to its reference position, whereby said gyroscope is caged, said caging assembly also including a detent pin mounted concentrically within said first pivot, and adapted to engage said knurled ring on the cylindrical portion of said inner gimbal shell when depressed, and means including a detent cam mounted on said caging assembly to depress said detent pin when actuated, and lever arm means forming an integral part of said caging arm to rotate said detent cam across said detent pin thereby to actuate said detent pin to lock said inner gimbal to said outer gimbal to facilitate caging said gyroscope, an uncaging spring mounted on said shaft and adapted to be compressed when said caging motor rotates said shaft, and means to disengage said clutch thereby releasing said caging arm to be withdrawn from the slots of said outer and inner gimbal cams thereby to uncage said gyroscope.

13. The combination set forth in claim 12 wherein said detent cam again depresses said detent pin during the uncaging rotation of said pivot shaft to lock said inner gimbal assembly to said outer gimbal as said caging arm is withdrawn from said inner gimbal reference slot, said detent pin being released at substantially the same instant said outer gimbal is uncaged by said caging arm, whereby single point uncaging is obtained with reduced gimbal error.

14. A gyroscope having an inner gimbal assembly, said inner gimbal assembly including a rotor, and a gimbal shell, said rotor being supported by said inner gimbal shell, an outer gimbal assembly, said inner gimbal assembly being mounted inside said outer gimbal assembly by a first and second pivot such as to allow movement of said inner gimbal about a first axis, a frame member, said outer gimbal being mounted on said frame member by a third and a fourth pivot such as to allow rotation of said outer gimbal about a second axis perpendicular to said first axis, said gyroscope frame having a caging assembly mounted thereon, said caging assembly including a caging motor, a pivot shaft, a caging arm mounted on said shaft, a spring clutch mounted on said shaft and adapted when engaged to rotate said shaft, each of said gimbals having a caging cam mounted concentrically with their respective axes of rotation, each of said cams having a reference position coinciding with the low point of each said cam and a slot at said reference position adapted to receive said caging arm, said outer gimbal caging cam slot adapted to permit said caging arm to pass therethrough to engage said inner gimbal caging cam, and means associated with said clutch to engage said clutch thereby to drive said caging arm against outer gimbal cam to rotate it to said reference position at which point said caging arm passes through said outer gimbal caging cam reference slot to engage said inner gimbal caging cam, and rotates said inner gimbal about its axis to its reference position whereby said gyroscope is caged, said clutch engaging means including an actuating member, said actuating member being spring loaded whereby said clutch is normally engaged, said caging assembly also including a spring loaded latch member, a pivot for mounting said latch member on said caging assembly, one end of said latch member being mechanically coupled to said actuating member, the other end of said latching member being disposed in the path of said caging arm which depresses said latching member at the bottom of its downward motion thereby locking said caging arm in its caged position, and means to actuate said actuating member thereby to unlatch said caging arm and disengage said clutch substantially simultaneously.

References Cited in the file of this patent
UNITED STATES PATENTS

| | | |
|---|---|---|
| 2,591,741 | Stone | Apr. 8, 1952 |
| 2,645,129 | Brown | July 14, 1953 |
| 2,960,874 | Glenny et al. | Nov. 22, 1960 |